(No Model.)
J. D. CLARKE.
MECHANISM FOR CONVERTING MOTION.
No. 271,421. Patented Jan. 30, 1883.
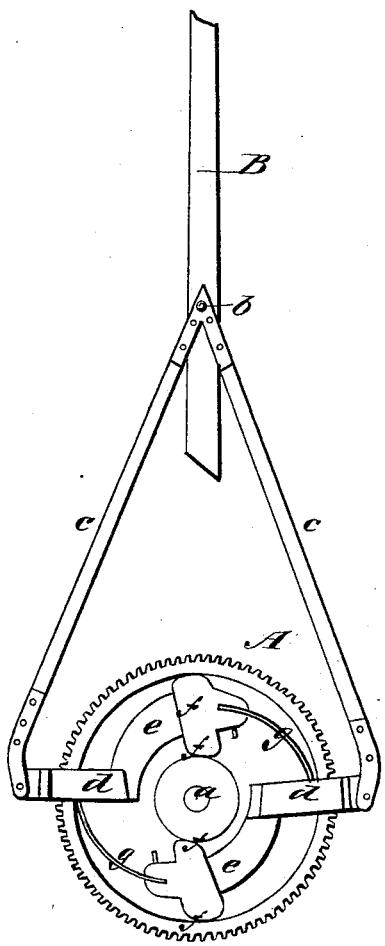
WITNESSES:
Francis McArdle
C. Sedgwick
INVENTOR:
J. D. Clarke
BY Munn & Co.
ATTORNEYS.

UNITED STATES PATENT OFFICE.

JAMES D. CLARKE, OF HARVARD, ILLINOIS.

MECHANISM FOR CONVERTING MOTION.

SPECIFICATION forming part of Letters Patent No. 271,421, dated January 30, 1883.

Application filed July 28, 1882. (No model.)

*To all whom it may concern:*

Be it known that I, JAMES D. CLARKE, of Harvard, in the county of McHenry and State of Illinois, have invented a new and Improved Mechanism for Converting Motion, of which the following is a full, clear, and exact description.

My invention relates to mechanisms for converting reciprocating into rotary motion, the special object being to furnish a mechanism for use with windmills.

The invention consists in the combination of a swinging frame, carrying dogs or pawls, with a recessed wheel, which the dogs engage by the reciprocation of the frame, as hereinafter described and claimed.

Reference is to be had to the accompanying drawing, forming part of this specification, in which my improved mechanism is shown by a side elevation.

A is the wheel, which is shown as a gear-wheel upon the shaft $a$.

B is the reciprocating rod of a windmill, upon the lower end of which, pivoted at $b$, is the frame carrying the dogs or pawls.

$c\ c$ are the rods forming the frame, fitted at their ends with arms $d\ d$, which carry the dogs or pawls $e\ e$.

Upon the side of the wheel A is an annular recess, and into this recess the ends of the dogs $e\ e$ project, the dogs being provided with friction-points $f\ f$, that take against the hub of the wheel on the under side of the flange formed by the recess.

$g\ g$ are springs connected with the ends of the dogs $e$, and extending in contact with the flange of the wheel, so as to retain the dogs in position.

In operation, the rod B being reciprocated, the dogs $e$ are caused to travel around in the recess of the wheel, and, being placed in reverse, one dog binds on the wheel by the upward movement of the rod and the other by the downward movement. The wheel is thereby given a continuous rotary movement in one direction. The wheel A may be geared to smaller gear-wheels for increasing the speed.

Having thus described my invention, I claim as new and desire to secure by Letters Patent—

The combination of the recessed wheel A, the dogs $e$, provided with friction-points $f$, the springs $g$, the arms $d$, and pivoted rods $c\ c$, substantially as described, for operation as set forth.

JAMES D. CLARKE.

Witnesses:
 WM. B. TRUAX,
 H. S. CHURCH.